United States Patent
Nerkar

(10) Patent No.: US 12,175,645 B2
(45) Date of Patent: Dec. 24, 2024

(54) METHODS, SYSTEMS AND COMPUTER PROGRAM PRODUCTS FOR GENERATING HIGH DYNAMIC RANGE IMAGE FRAMES

(71) Applicant: Innosapien Agro Technologies Private Limited, Maharashtra (IN)

(72) Inventor: Sarang Dilip Nerkar, Maharashtra (IN)

(73) Assignee: Innosapien Agro Technologies Private Limited, Thane (IN)

( * ) Notice: Subject to any disclaimer, the term of this patent is extended or adjusted under 35 U.S.C. 154(b) by 263 days.

(21) Appl. No.: 17/618,584

(22) PCT Filed: Jun. 11, 2020

(86) PCT No.: PCT/IB2020/055473
§ 371 (c)(1),
(2) Date: Dec. 13, 2021

(87) PCT Pub. No.: WO2020/250163
PCT Pub. Date: Dec. 17, 2020

(65) Prior Publication Data
US 2022/0261970 A1   Aug. 18, 2022

(30) Foreign Application Priority Data

Jun. 11, 2019   (IN) .............................. 201921023132

(51) Int. Cl.
*G06T 5/92*     (2024.01)
*G06T 5/50*     (2006.01)

(52) U.S. Cl.
CPC .................. *G06T 5/92* (2024.01); *G06T 5/50* (2013.01); *G06T 2207/10016* (2013.01); *G06T 2207/10144* (2013.01); *G06T 2207/20208* (2013.01); *G06T 2207/20221* (2013.01)

(58) Field of Classification Search
CPC ........................ G06T 5/92; G06T 5/50; G06T 2207/10016; G06T 2207/10144; G06T 2207/20208; G06T 2207/20221; G06F 3/147; G09G 5/10; G09G 2340/10
USPC ........................................................ 382/274
See application file for complete search history.

(56) References Cited

U.S. PATENT DOCUMENTS

| 10,148,893 | B2 | 12/2018 | Gupta et al. |
| 2014/0044336 | A1 | 2/2014 | Yamaguchi et al. |
| 2016/0037046 | A1 | 2/2016 | Nashizawa |
| 2018/0288336 | A1 | 10/2018 | Aokage |
| 2018/0338078 | A1* | 11/2018 | Cote .................. H04N 23/6811 |

OTHER PUBLICATIONS

International Search Report from PCT International Application No. PCT/IB2020/055473, dated Oct. 22, 2020.
(Continued)

*Primary Examiner* — Stephen P Coleman
(74) *Attorney, Agent, or Firm* — Budzyn IP Law, LLC

(57) ABSTRACT

The invention relates to digital video image processing. In particular, the invention provides methods, systems and computer program products that optimize processes for generation of high dynamic range output video streams by optimizing the processes of parsing or extracting information from multiple input image frames and combining the multiple input image frames into a composite high dynamic range output video frames.

13 Claims, 11 Drawing Sheets

(56) References Cited

OTHER PUBLICATIONS

Mann, et al., "Realtime HDR (High Dynamic Range) Video for Eyetap Wearable Computers, FPGA-Based Seeing Aids, and Glasseyes (EyeTaps)", Electrical & Computer Engineering (CCECE), 2012 25th IEEE Canadian Conference on Apr. 29, 2012, pp. 1-6, XP032257134, ISSN: 0840-789-7789, DOI:10.1109/CCECE.2012.6335012, ISBN: 978-1-4673-1431-2.

* cited by examiner

METHODS, SYSTEMS AND COMPUTER PROGRAM PRODUCTS FOR GENERATING HIGH DYNAMIC RANGE IMAGE FRAMES

CROSS-REFERENCE TO RELATED APPLICATIONS

This Application is a National Stage Application under 35 U.S.C. § 371 of PCT Application No. PCT/IB2020/055473, filed Jun. 11, 2020, which claims priority from and the benefit of Indian Patent Application No. 201921023132 filed on Jun. 11, 2019, which are hereby incorporated by reference in their respective entireties.

FIELD OF THE INVENTION

The invention relates to digital video image processing and, more particularly, but not exclusively, to methods, systems and computer program products for optimizing generating of high dynamic range (HDR) output image frames.

BACKGROUND

Conventional image capture devices such as cameras, digital cameras, video cameras, and/or digital image sensors typically capture and store image frames where brightness information is represented by a fixed number of bits (for example 8 bits) per pixel. The fixed number of bits assigned to each pixel presents a limit on the number or range of discrete luminance values that can be recorded by that pixel—and as a result, pixels within a typical image sensor are usually inadequate to represent the entire range of luminance levels within a field of view associated with the image capture device,—since real world situations involve brightness variations which are ordinarily well beyond the luminance range that an image sensor is typically configured to respond to within a single image frame.

Every sensor (including without limitation, image sensors) has a characteristic dynamic range—which dynamic range can be understood as a representation of the image sensor's capacity to capture and represent a range of physical phenomena. In the case of an image sensor, the characteristic dynamic range is a range of illumination intensities that the image sensor can capture. Illumination intensities outside of this characteristic dynamic range is typically represented in an image frame generated by the image sensor as oversaturated or undersaturated pixels, which do not convey meaningful image information. While the intensity of illumination incident on an image sensor can be controlled by changing the input parameters such as ISO, shutter speed, gain etc., the net difference between the highest and lowest illumination intensity levels in a particular image still cannot be meaningfully represented if this net difference exceeds the characteristic dynamic range of the image sensor.

Various prior art solutions are known for expanding the dynamic range of a camera. The earliest included manipulating image sensor exposure mechanisms such as lens aperture, ISO or shutter speed to maximize the overall detail that would be faithfully recorded—with photographers exposing the same scene at multiple different exposure setting (known as image bracketing) and subsequently selecting an exposure that is most suitable, while discarding the rest. A more advanced method of expanding the dynamic range of an image sensor involves combining images captured with different exposure settings to form a final image having expanded dynamic range, while continuing to exhibit subtle differences in exposure (see for example U.S. Pat. No. 5,828,793).

A common feature of solutions for generating a high dynamic range image typically involve the capture of multiple images of a field of view, each having different luminance properties. These multiple images represent different segments of the complete illumination range within the field of view—and a high dynamic range composite image or composite image frame can be generated from these multiple images, such that the information within the composite image or composite image frame covers a wider luminance range than any of the individual images that have been used to generate the composite image or image frame.

A consequence of this approach is that the process of extracting information from a plurality of individual image frames (input frames), combining this information in a meaningful manner, and generating a composite image or image frame based on the plurality of input frames is computationally intensive and requires adequately high processor configurations and sufficient processing time. While this is typically acceptable for situations where an end user is interested in generating single composite image frames (i.e. still photography), implementation of high dynamic range solutions for video photography or for generating output video streams has proved problematic, since generation of each output high dynamic range image frame for an output video stream involves acquiring multiple input images frames of a field of view under different exposure parameters, parsing information from said multiple input image frames and combining the multiple input image frames into a single composite high dynamic range output video frame—which involves significant processing power and processing time—and which results in lag between generation of individual output video frames. The lag interferes with achieving of "real time frame rate" for which reasons prior art solutions that implement high dynamic range methodologies for generating a high dynamic range videostream have been found to be unsuccessful or resulting in a poor viewing experience.

This deficiency in the state of art has been found to be particularly challenging for the reason that there are several technical fields and/or end uses that would benefit directly from high dynamic range video that provides or appears to provide a real time video rate—for example industrial applications/video surveillance or video safety monitoring applications that involve fields of view having a illuminance range that is outside of the dynamic range of typical digital video cameras (for example image sensors being used to monitor a welding process or a forging process). Further, the minimum processor capabilities required for high dynamic range output videostreams has been found to be high—as a result of the number of input images that require to be processed for generating each output high dynamic range video frame, which is an obstacle to implementation of high dynamic range video technologies using low cost or lower end processors, which in turn presents obstacles to adoption of the high dynamic range video.

There is accordingly a need for a solution that optimizes the processes of parsing information from said multiple input image frames and combining the multiple input image frames into a single composite high dynamic range output input frame—which in solutions presently known in the art requires significant processing power and processing time

SUMMARY

The present invention provides methods, systems and computer program products that optimize processes for generation of high dynamic range output image frames or video streams by optimizing the processes of parsing or extracting information from multiple input image frames and combining the multiple input image frames into a composite high dynamic range output image frames or video image frames.

In an embodiment, the invention presents a method for generating a plurality of high dynamic range image frames. The method for generating a plurality of high dynamic range image frames, may comprise the steps of (i) receiving a first set of input image frames comprising at least a first input image frame and a second input image frame, wherein (a) the first input image frame has been generated at a first exposure level, and (b) the second input image has been generated at a second exposure level that is different than the first exposure level, (ii) generating a first high dynamic range image frame based on the first set of input image frames, (iii) receiving a second set of input image frames comprising at least the second input image frame and a third input image frame, wherein (c) the third input image frame has been generated at a third exposure level, and (d) the third exposure level is different from the second exposure level, (iv) generating a second high dynamic range image frame based on the second set of input image frames, and (v) initiating successive display of the first high dynamic range image frame and the second high dynamic range image frame on a display device.

In an embodiment of the method (i) the second exposure level is higher than the first exposure level, and/or (ii) the third exposure level is lower than the second exposure level.

In a method embodiment, generating either of the first high dynamic range image frame based on the first set of input image frames, or the second high dynamic range image frame based on the second set of input image frames, includes implementing any of the steps of image registration of a plurality of input image frames, image mixing based on a plurality of input image frames, tone mapping based on a plurality of input image frames, generating a histogram based on input image information corresponding to a plurality of input image frames, and generating a joint comparametric histogram based on histograms.

In a specific embodiment of the method (i) the first set of input images includes a fourth input image frame having a fourth exposure level, wherein the fourth exposure level is higher than the first exposure level, and is lower than the second exposure level, (ii) the second set of input images includes the fourth input image frame, and the third exposure level is different from the fourth exposure level. In a more particular embodiment, the third exposure level is lower than the fourth exposure level.

The method may additionally comprise the steps of (i) receiving a third set of input image frames comprising at least the third input image frame and a fifth input image frame, wherein (a) the fifth input image frame has been generated as a fifth exposure level, and (b) the fifth exposure level is different from the third exposure level, (ii) generating a third high dynamic range image frame based on the third set of input image frames, and (c) initiating display of the third high dynamic range image frame on the display device, successively after the initiation of display of the second high dynamic range image frame on the display device.

In a specific embodiment of this method, the fifth exposure level is higher than the third exposure level.

The invention additionally comprises a system for generating a plurality of high dynamic range image frames. The system may include a processor configured for implementing the steps of (i) receiving a first set of input image frames comprising at least a first input image frame and a second input image frame, wherein (a) the first input image frame has been generated at a first exposure level, and (b) the second input image has been generated at a second exposure level that is different from the first exposure level, (ii) generating a first high dynamic range image frame based on the first set of input image frames, (iii) receiving a second set of input image frames comprising at least the second input image frame and a third input image frame, wherein (c) the third input image frame has been generated at a third exposure level, and (d) the third exposure level is different from the second exposure level, (iv) generating a second high dynamic range image frame based on the second set of input image frames, and (v) initiating successive display of the first high dynamic range image frame and the second high dynamic range image frame on a display device.

In an embodiment of the system (i) the second exposure level is higher than the first exposure level, and/or (ii) the third exposure level is lower than the second exposure level.

The processor of the system may be configured such that generating either of the first high dynamic range image frame based on the first set of input image frames, or the second high dynamic range image frame based on the second set of input image frames, includes implementing any of the steps of image registration of a plurality of input image frames, image mixing based on a plurality of input image frames, tone mapping based on a plurality of input image frames, generating a histogram based on input image information corresponding to a plurality of input image frames, and generating a joint comparametric histogram based on histograms.

In another system embodiment, the processor is configured such that (i) the first set of input images includes a fourth input image frame having a fourth exposure level, wherein the fourth exposure level is higher than the first exposure level, and is lower than the second exposure level, (ii) the second set of input images includes the fourth input image frame, and (iii) the third exposure level is different from the fourth exposure level.

The system may be configured such that the third exposure level is lower than the fourth exposure level.

In a further system embodiment, the processor is configured for (i) receiving a third set of input image frames comprising at least the third input image frame and a fifth input image frame, wherein (a) the fifth input image frame has been generated as a fifth exposure level, and (b) the fifth exposure level is different from the third exposure level, (ii) generating a third high dynamic range image frame based on the third set of input image frames, and (iii) initiating display of the third high dynamic range image frame on the display device, successively after the initiation of display of the second high dynamic range image frame on the display device.

The system may be configured such that the fifth exposure level is higher than the third exposure level.

The invention may additionally comprise a computer program product comprising a non-transitory computer readable medium having stored thereon, computer code for implementing a method of generating a plurality of high dynamic range image frames, the computer readable program code comprising instructions for implementing within a processor based computing system, the steps of (i) receiving a first set of input image frames comprising at least a first input image frame and a second input image frame, wherein (a) the first input image frame has been generated at a first exposure level, and (b) the second input image has been generated at a second exposure level that is different from the first exposure level, (ii) generating a first high dynamic range image frame based on the first set of input image frames, (iii) receiving a second set of input image frames comprising at least the second input image frame and a third input image frame, wherein (c) the third input image frame has been generated at a third exposure level, and (d) the third exposure level is different from the second exposure level, (iv) generating a second high dynamic range image frame based on the second set of input image frames, and (v) initiating successive display of the first high dynamic range image frame and the second high dynamic range image frame on a display device.

BRIEF DESCRIPTION OF THE ACCOMPANYING DRAWINGS

DETAILED DESCRIPTION

Figure 1:
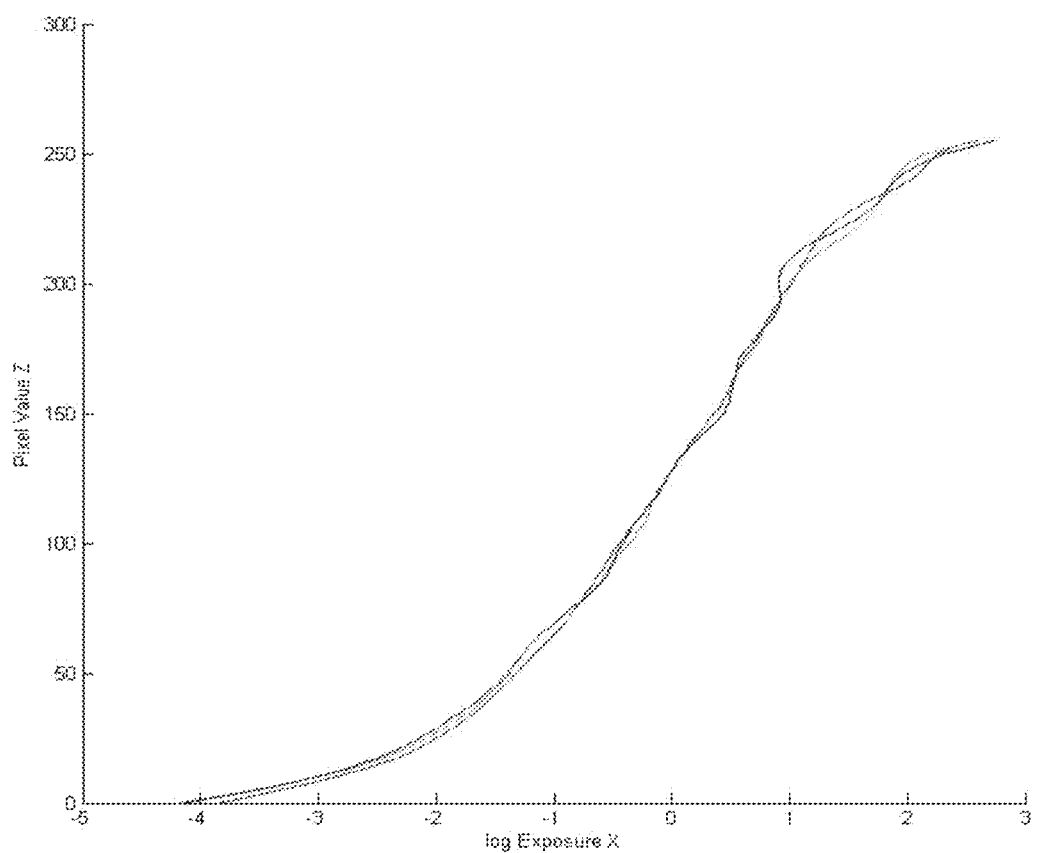
FIG. 1 is a sample response function of a camera/image sensor.

The present invention seeks to present computationally efficient and time efficient processes for generating high dynamic range output image frames, or video frames.

The implementation of the invention requires to be understood in the context of existing methods for generation of high dynamic range images. As discussed briefly above, images captured by digital image sensors are most commonly Low Dynamic Range (LDR) images, in which each image pixel is assigned a limited number of digital bits—and the assigned number of digital bits per pixel presents a limit on the range of luminance values that can be recorded or represented by the pixel. The number of digital bits per pixel comprises the digital pixel bit width value and this number is ordinarily 8 bits (but can have other values as well). 8-bit pixels are used to form an image with 256 different gray levels for each color at each pixel location. In an LDR image of a field of view associated with an image sensor, shadow areas of the scene are depicted as being completely black (black saturation or undersaturation), bright sunlit areas of the scene are depicted as being completely white (white saturation or oversaturation), and scene areas in between are shown in a range of gray shades.

A High Dynamic Range (HDR) image on the other hand can be understood as an image that has digital pixel bit width values of greater than 8 bits (e.g. 16 bits per pixel is a possible value). In an HDR image, a more complete range of gray shades that appear within a field of view can be displayed. These gray shades provide image details that are present in the scene's shadow regions, highlight regions and mid tone regions and that would ordinarily be missing from an LDR image.

Accordingly, in an HDR image, scene details are present in image dark areas that are in shadow, in light areas directly illuminated by bright light, as well as in mid-illumination areas that are illuminated between these two extremes.

At a high level, generation of an output HDR image through an LDR image sensor can be understood as being achieved by acquiring multiple input LDR images of a field of view that are captured at different exposure levels. Each set of input LDR images that are used to generate an output HDR image may be referred to as a "bracketed input image series". The selection of appropriate images for inclusion within the bracketed input image series of LDR images used to generate an output HDR image significantly affects the image characteristics of the resulting output HDF image.

For the purposes of this written description, the term "exposure level" shall be understood as total amount of light that is permitted to be incident on an image sensor, or that is permitted to be sensed by the image sensor, during the process of sensing a scene to produce an image. For example, when sensing a scene under fixed illumination with an imaging system with an optical path that has a fixed aperture, the exposure level is controlled by setting the imaging system's exposure time (shutter speed) or the integration time of an image sensor. In another example, when sensing a scene with fixed illumination with an imaging system with an optical path that has a variable aperture, the exposure level is controlled by setting the imaging system's exposure time and aperture. When comparing two images that have been generated based on differing quantities of light that was incident on or sensed by the image sensor, the image that has been generated based on a higher quantity of incident light shall be understood to have a "higher" exposure level, while the image that has been generated based on a lower quantity of incident light shall be understood to have a lower exposure level.

Typically, a bracketed input image series of LDR images that is used to generate an output HDR image requires at the very least a first input image acquired at a relatively low exposure level (for example, an image acquired at one or more of a high shutter speed, or a low integration time, or with a small aperture setting, or with a high ISO setting), and a second input image acquired at a relatively high exposure level (for example, an image acquired at one or more of a low shutter speed, or a high integration time, or with a large aperture setting, or with a low ISO setting).

A low exposure level will properly capture the gray shades in field of view areas fully illuminated by bright light and a high exposure level will properly capture the gray shades in scene areas completely shielded from direct light. However, at the low exposure level the areas of the scene that are not illuminated directly or that are in shadow will be completely black, in black saturation, and show no detail, while the midtone areas will simultaneously lose detail. Further, at the high exposure level, the highlighted areas within the field of view will be completely white, in white saturation, and show no detail, while the mid-tone areas will again lose detail. Thus preferably, in addition to having a low exposure level image and a high exposure level image within the bracketed input image series of LDR images, said bracketed input image series may also include at least a third, mid exposure level image, which properly captures mid level gray shades. By extracting image information from each of the input images within the bracketed input image series, and combining the extracted image, an HDR image can be generated that depicts the full gray scale range of the scene.

For the purposes of fully understanding the invention, an explanation of one of the non-limiting and exemplary methods for combining a plurality of input images within a bracketed input image series for the purposes of generating an output HDR image is explained below.

As discussed briefly above, each image sensor/digital sensor has a characteristic response function/curve that relates the flux of the radiant energy per unit area at the sample plane to the measured intensity values. This means that in the case of an image sensor, the response function relates the exposure value (composite value relative to the input parameters of the camera) to the response of the sensor, i.e. the actual number of photons received by the sensor (referred to as "photoquantity" for the purposes of this written description). As the exposure value increases (for example by increasing ISO or decreasing the shutter speed or increasing integration time of a digital sensor) more light is exposed to the sensor and thus higher response is recorded by the sensor (i.e. higher pixel values).

A sample response function of a camera/image sensor is illustrated in FIG. 1. As shown in FIG. 1, the pixel values increase as the exposure value associated with an image sensor increases By using different input parameters, a plurality of image samples of the field of view can be acquired with different exposure values. These samples are the LDR input images within a bracketed input image series and are used for generating an output HDR image that has a cumulative dynamic range of the LDR input images.

Figure 2A:
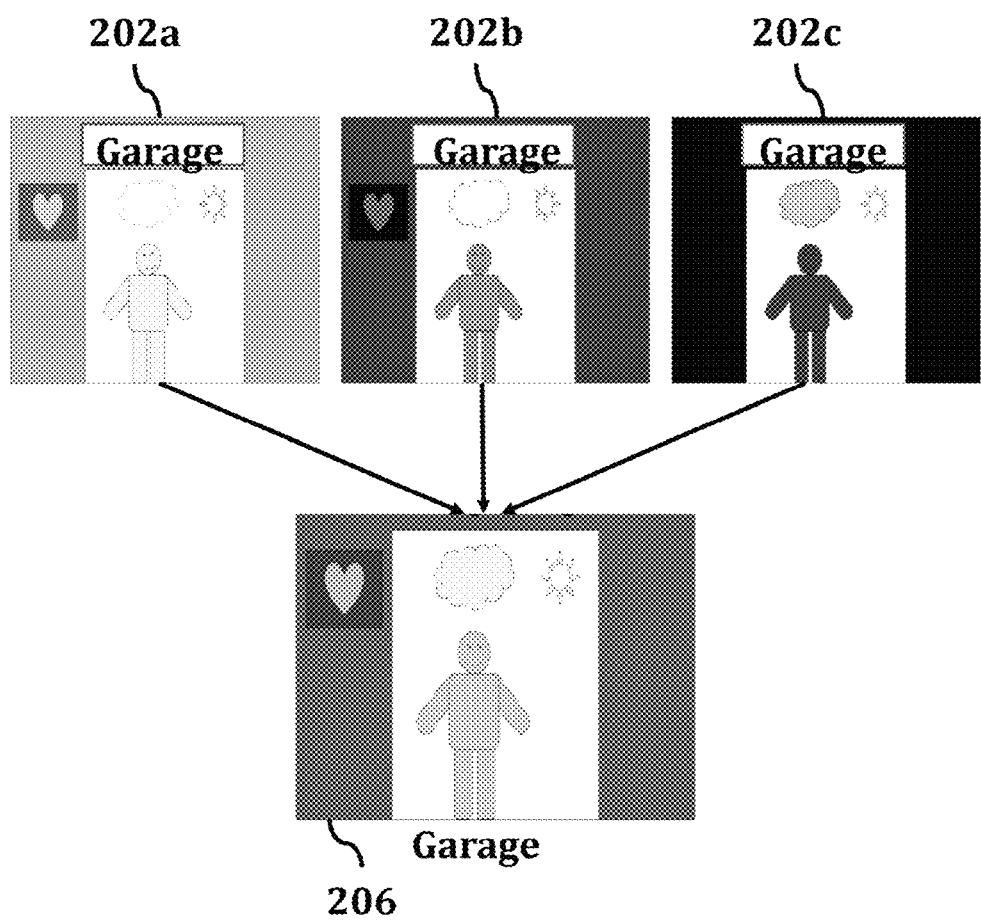
FIGS. 2A and 2B illustrate explanatory embodiments of HDR image compositing.

For example, as shown in FIG. 2A, the three images 202a, 202b, 202c on the top are LDR input images which are composited into the single output HDR image 206 at the bottom, which has an extended dynamic range. In the illustration of FIG. 2A, the output HDR image 206 captures and displays illumination intensities from across each of the input LDR images 202a, 202b, 202c evenly while eliminating the undersaturation and oversaturation problems that are found in the LDR input images 202a, 202b, 202c.

For the purposes of the explanation, input image 202a in FIG. 2A is referred to as "image_high", input image 202b in FIG. 2A is referred to as "image_mid", input image 202c in FIG. 2A is referred to as "image_low", and output HDR image 206 in FIG. 2A is referred to as "image_hdr". Further, The pixel value of pixel i in image_high may be represented as $P_1(i)$.
The photoquantity of pixel i in image_high is represented as $Q_1(i)$.
The pixel value of pixel i in image_mid is represented as $P_2(i)$.
The photoquantity of pixel i in image_mid is represented as $Q_2(i)$.
The pixel value of pixel i in image_low is represented as $P_3(i)$.
The photoquantity of pixel i in image_low is represented as $Q_3(i)$.
The pixel value of pixel i in image_low is represented as $P_3(i)$.
The photoquantity of pixel i in image_low is represented as $Q_3(i)$.
The pixel value of pixel i in image_hdr is represented as $P_{hdr}(i)$.
The photoquantity of pixel i in image_hdr is represented as $Q_{hdr}(i)$.
The response function of the image sensor used to acquire input images 202a, 202b, 202c is represented as F, such that:
$P_1(i)=F(Q_1(i))$
$P_2(i)=F(Q_2(i))$
$P_3(i)=F(Q_3(i))$
$P_{hdr}(i)=F(Q_{hdr}(i))$ For the purposes of generating output HDR image 206, it is necessary to determine $P_{hdr}(i)$ for all values of i.

Figure 2B:
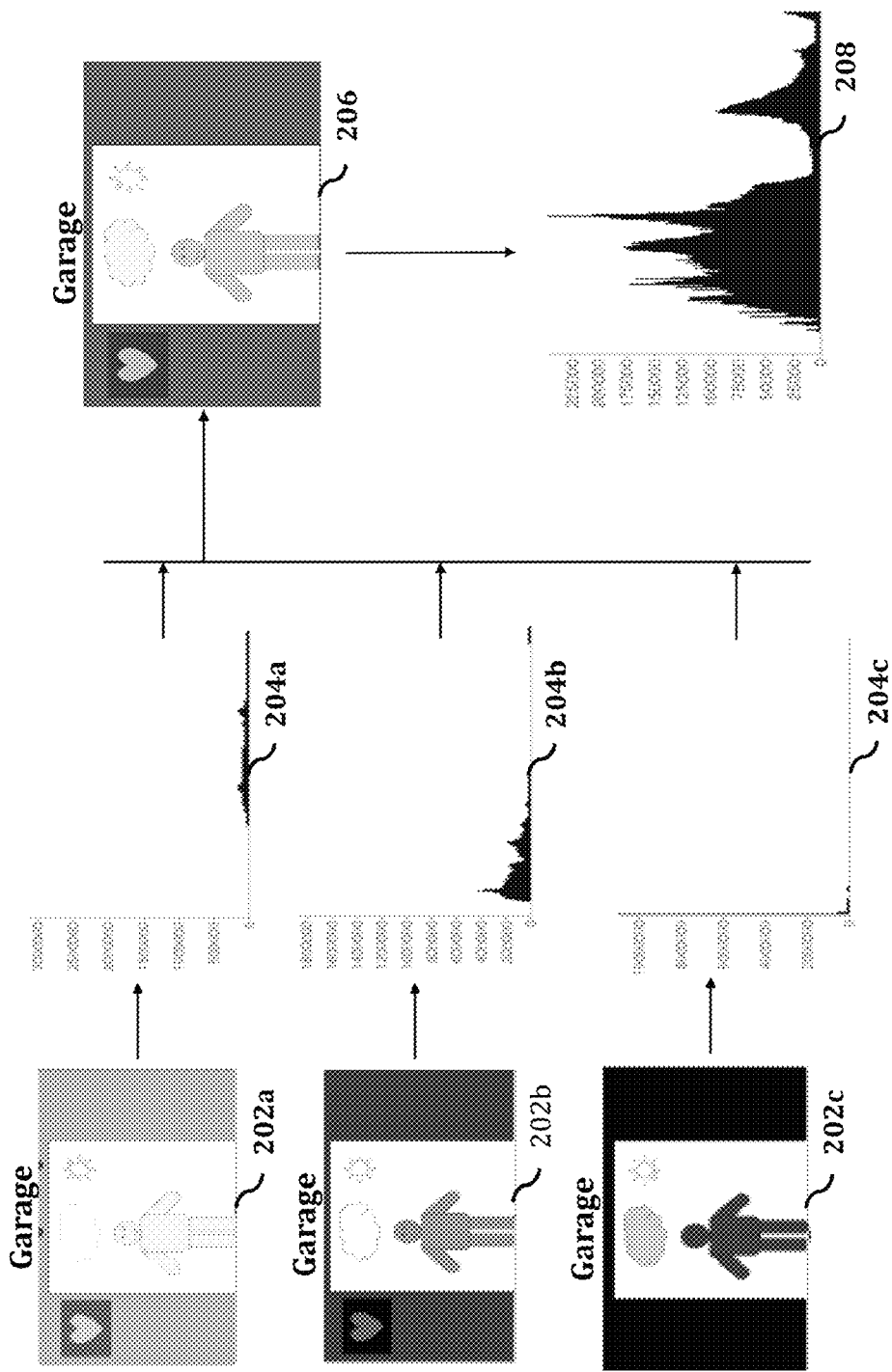

An exemplary process for achieving this determination and thereby generating output HDR image 206 may be further understood with reference to FIG. 2B.

As shown in FIG. 2B, each of input images 202a, 202b, 202c are used to generate a corresponding histogram 204a, 204b, 204c. Each histogram 204a, 204b, 204c corresponding respectively to an input image 202a, 202b, 202c is a statistical representation of the number of pixel illumination values that lie in a certain range of values. The histogram establishes or represents how much meaningful image data is present in a particular input image. For instance, the histogram 204a that is generated based on information extracted from the first input image 202a establishes that there are a large number of pixels that correspond to the highest value (white color) which means that a large number of the image pixels are saturated. Similarly, the histogram 204c that is generated based on information extracted from the third input image 202c establishes that there are a large number lot of pixels that correspond to the lowest value (black color) which means that a large number of image pixels are undersaturated.

It will however be noted that notwithstanding the undersaturation and oversaturation in portions of the input images, the histogram 208 that corresponds to the composited HDR output image 206 resulting from compositing of input images 204a, 204b, 204c establishes that the image data within the composited HDR output image 206 comprises meaningful image data (i.e. data neither saturated nor undersaturated.

In brief, the combining of input images within a bracketed input image series to generate a composited HDR image may be achieved in any number of ways—including in a simplistic approach, by using deriving an average pixel luminance value based on the luminance values of corresponding pixels in each of the input images—provided it is understood that each such method has different processing and configuration requirements, and different levels of success in generating an HDR image that comprises meaningful image data.

In a particular approach, the histograms corresponding to a pair of individual input images within a bracketed input image series, are thereafter used to generate a comparametric histogram, which comparametric histogram is a 2D array representing the joint histograms of each of the pair of individual input images. This 2D array enables relating of the photoquantites obtained with one exposure value to the photoquantities obtained with another exposure value which still maintaining the integrity of the data (i.e. by eliminating any possible confusion arising out of identical or similar pixel values). For the purposes of this description:

a joint histogram of image_high and image_mid is represented as $G_{12}(\ )$.

a joint histogram of image_mid and image_low is represented as $G_{23}(\ )$.

a joint histogram of image_low and image_high is represented as $G_{31}(\ )$.

For the purposes of the illustrative example discussed in connection with FIGS. 2A and 2B, each pixel value of the composited image can be obtained by combining the relative photoquantites of the corresponding pixel values of the input images and then normalizing them to one photoquantity that corresponds to the pixel value of the composited image—i.e.

$P_{hdr}(i)=F(Q_{hdr}(i))$ $Q_{hdr}(i)=[Q_1(i)\ Q_2(i)+Q_3(i)]/di$, where "di" represents the total number of input images being used to generate the composited image.

To make meaningful determinations for $Q_{hdr}(i)$, it is required to bring all values to one photoquantity base. In the example under discussion, assume that all values are normalized to the base of image_mid, such that:

$Q_1(i)=G^{-1}{}_{12}(G_{12}(Q_2(i)))$ $Q_3(i)=G^{-1}{}_{23}(G_{23}(Q_2(i)))$ $Q_{hdr}(i)=[G^{-1}{}_{12}(G_{12}(Q_2(i)))+Q_2(i)+G^{-1}{}_{23}(G_{23}(Q_2(i)))]/di$ $Q_{hdr}(i)=[G^{-1}{}_{12}(G_{12}(F^{-1}{}_1(P_2(i))))+Q_2(i)+G^{-1}{}_{23}(G_{23}(F^{-1}{}_3(P_2(i))))]/di$ $P_{hdr}(i)=[G^{-1}{}_{12}(G_{12}(F^{-1}{}_1(P_2(i))))\ Q_2(i)\ G^{-1}{}_{23}(G_{23}(F^{-1}{}_3(P_2(i))))]/di)$ It would be understood that in each of the above, "di" represents the total number of input images being used to generate the composited image.

By implementing the above process, the composited HDR output image 206 is generated based on accurate pixel values that are determined based on the pixel values of each of input images 202a, 202b, 202c.

The exemplary process of generating a composited HDR output image that has been discussed above, can be briefly summarized (and which may be understood in more detail with reference to the disclosure in reference U.S. Pat. No. 5,828,793) as comprising the steps of:

obtaining a plurality of differently exposed input images of the same object or scene or field of view—each of the input images comprising an ordered array of pixels establishing a response function characterizing the input images in terms of values of a response parameter and exposures producing the values based on the established response function, combining the input images into a composite image comprising image detail from each of the source images and having a greater range of image detail than any of the input images—the composite image also comprising an ordered array of pixels—wherein the pixels of the composite image correspond to the pixels of the input images, and the input images are combined by assigning, to each composite-image pixel, a pixel-parameter value representing a weighted average of the pixel parameter of corresponding pixels from the input images. The weighted average of the pixel parameter of corresponding pixels from the input images may be obtained by:

for input source image, generating a certainty function characterizing a tonal range of greatest image detail, and or each composite-image pixel, (i) weighing the corresponding pixels from the source images in accordance with the certainty functions, (ii) combining the pixel-parameter values of the corresponding source image pixels in accordance with the weighting, and (iii) assigning the combined pixel-parameter value to the composite-image pixel.

In addition to the above discussed exemplary process, there are several other methods for deriving a HDR image from a bracketed input image series. It would however be understood that regardless of specific implementation details, each method requires complex and computationally intensive implementation engines. This is due to the need to perform multiple separate processing operations to extract image information from each input image within the bracketed input image series, including for example, the steps of image registration (i.e. accurately align pixels within each of the multiple input images with each other), image mixing (i.e. combining pixel information extracted from each of the multiple images with appropriate weighting assigned to pixel information from each input image) and tone mapping (i.e. preparing the final output HDR image for presentation on a conventional display that is limited to displaying 8 bit per pixel per color image pixels).

Moreover, the number of computations and processes is multiplied in the case of generating an output HDR videostream—since each output HDR video frame requires to be based on a separate or discrete bracketed input image series, and generation of each output HDR video frame based on a corresponding bracketed input image series will therefore require implementation of all of the above discussed steps.

The present invention optimizes the process of generating a plurality of output HDR image frames, or generating a plurality of output HDR image frames or an output HDR videostream, by optimizing the computational and time requirements involved in generating each output HDR image frame or output HDR video frame.

The present invention achieves the optimization based on the discovery that a bracketed input image series based on which an output HDR image frame within a set of successively generated HDR image frames (for example within an HDR video stream) is generated, need not be comprised entirely of new or unique input images—and that instead any two or more successive (or immediately successive) output HDR image frames within the set of successively generated HDR image frames or within the HDR video stream may be generated based on corresponding bracketed input image series that share one or more common input images, provided at least one input image within each corresponding bracketed input image series is different.

By generating successive output HDR image frames (for example first and second output HDR image frames) based on corresponding successive bracketed input image series (for example first and second bracketed input image series) that are selected such that one or more input images within the first and second bracketed input image series are shared, the invention eliminates one or more image processing steps corresponding to the shared input image when generating the second output HDR image frame—and instead relies on the results of the same image processing steps that have been carried out on the shared input image in a previous iteration, where the first output HDR image frame has been generated using information extracted from the shared input image. The elimination of the one or more image processing steps for one or more shared input images in generating an output HDR image frame (for example, an output HDR image frame within an HDR videostream) has been found to result in significant computational and time efficiencies.

Figure 3A:
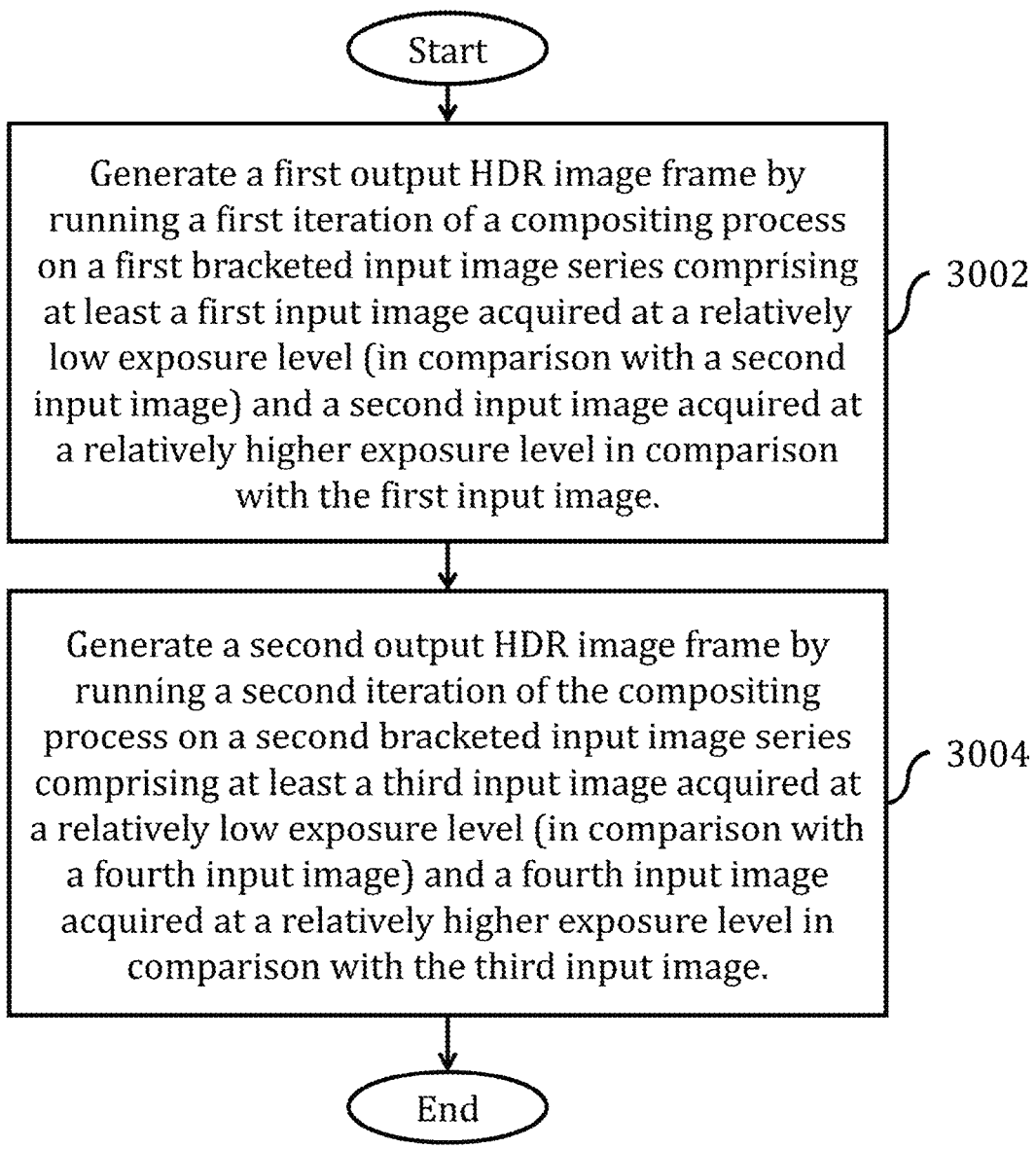
FIG. 3A is a flowchart illustrating a conventional method of generating successive output HDR image frames based on successive bracketed input image series' generated by an image sensor.
Figure 3B:
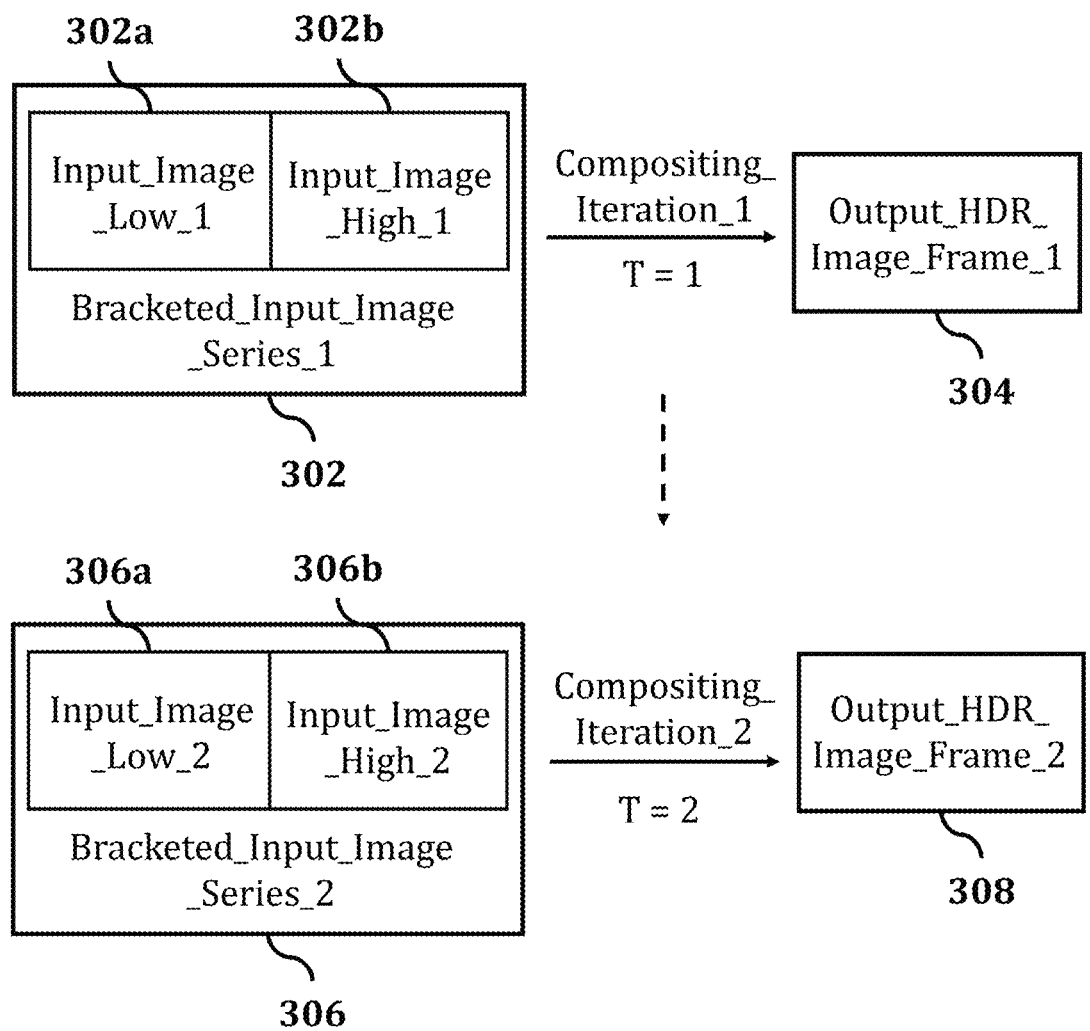
FIG. 3B is a flow diagram illustrating a conventional method of generating successive output HDR image frames based on successive bracketed input image series' generated by an image sensor.

The process of the present invention and the corresponding optimization and improvement arising out of the inventive process may be conveniently understood in comparison with the previously existing solution for generating HDR image frames in a videostream. FIGS. 3A and 3B illustrates an exemplary process of the type that is known in the state of art—and over which the present invention seeks to provide optimizations.

FIG. 3A is a flowchart illustrating a conventional method of generating successive output HDR image frames based on successive bracketed input image series' generated by an image sensor.

Step 3002 comprises generating a first output HDR image frame (for example an HDR video frame) by running a first iteration of a compositing process on a first bracketed input image series comprising at least a first input image acquired at a relatively low exposure level (in comparison with a second input image) and a second input image acquired at a relatively higher exposure level in comparison with the first input image.

Step 3004 comprises generating a second output HDR image frame (for example an HDR video frame) by running a second iteration of the compositing process on a second bracketed input image series comprising at least a third input image acquired at a relatively low exposure level (in comparison with a fourth input image) and a fourth input image acquired at a relatively higher exposure level in comparison with the third input image.

The generated first output HDR image frame and second output HDR image frame may thereafter be displayed as successive image frames (for example, successive video frames within an output video stream).

The method of FIG. 3A is illustrated further in the flow diagram of FIG. 3B. As shown in FIG. 3B the first output HDR image frame 304 (Output_HDR_Image_Frame_1) is generated (at step 3002 of FIG. 3A) by running a first iteration of a compositing process on a first bracketed input image series 302 (Bracketed_Input_Image_Series_1) comprising a first input image 302a (Input_Image_Low_1) acquired at a relatively low exposure level (in comparison with second input image 302b) and a second input image 302b (Input_Image_High_1) acquired at a relatively higher exposure level in comparison with first input image 302a). It would be understood that the first iteration of the compositing process would involve one or more of image registration, image mixing and tone mapping involving first and second input images 302a and 302b, and further that image mixing involving the first and second input images 302a and 302b may involve generating a histogram corresponding to each of input images 302a and 302b and optionally generating a first joint comparametric histogram based on the histograms corresponding to each of input images 302a and 302b—which may then be used for generating a first composited output HDR image frame 304.

Subsequently, as shown in FIG. 3B, the second output HDR image frame 308 (Output_HDR_Image_Frame_2) is generated (at step 3002 of FIG. 3B) by running a second iteration of the compositing process on a second bracketed input image series 306 (Bracketed_Input_Image_Series_2) comprising a first input image 306a (Input_Image_Low_2) acquired at a relatively low exposure level (in comparison with second input image 306b) and a second input image 306b (Input_Image_High_2) acquired at a relatively higher exposure level in comparison with first input image 306a). It would be understood that the second iteration of the compositing process would once again involve one or more of image registration, image mixing and tone mapping involving first and second input images 306a and 306b, and further that image mixing involving the first and second input images 306a and 306b may involve generating a histogram corresponding to each of input images 306a and 306b and optionally generating a second joint comparametric histogram based on the histograms corresponding to each of input images 306a and 306b—which may then be used for generating a second composited output HDR image frame 306.

Figure 4A:
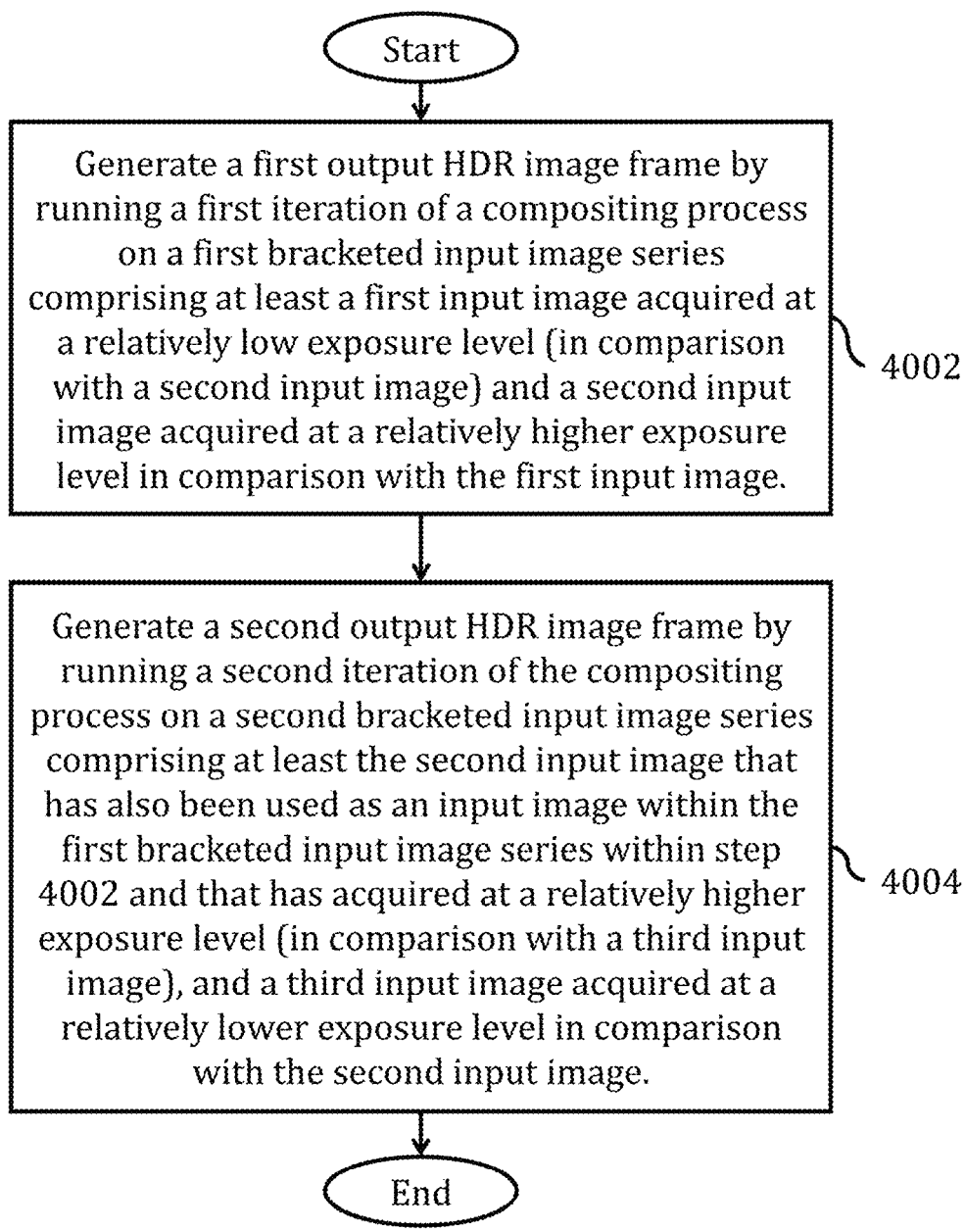
FIGS. 4A and 5A are respectively flowcharts illustrating methods of generating successive output HDR image frames based on successive bracketed input image series' generated by an image sensor, in accordance with the teachings of the present invention.
Figure 4B:
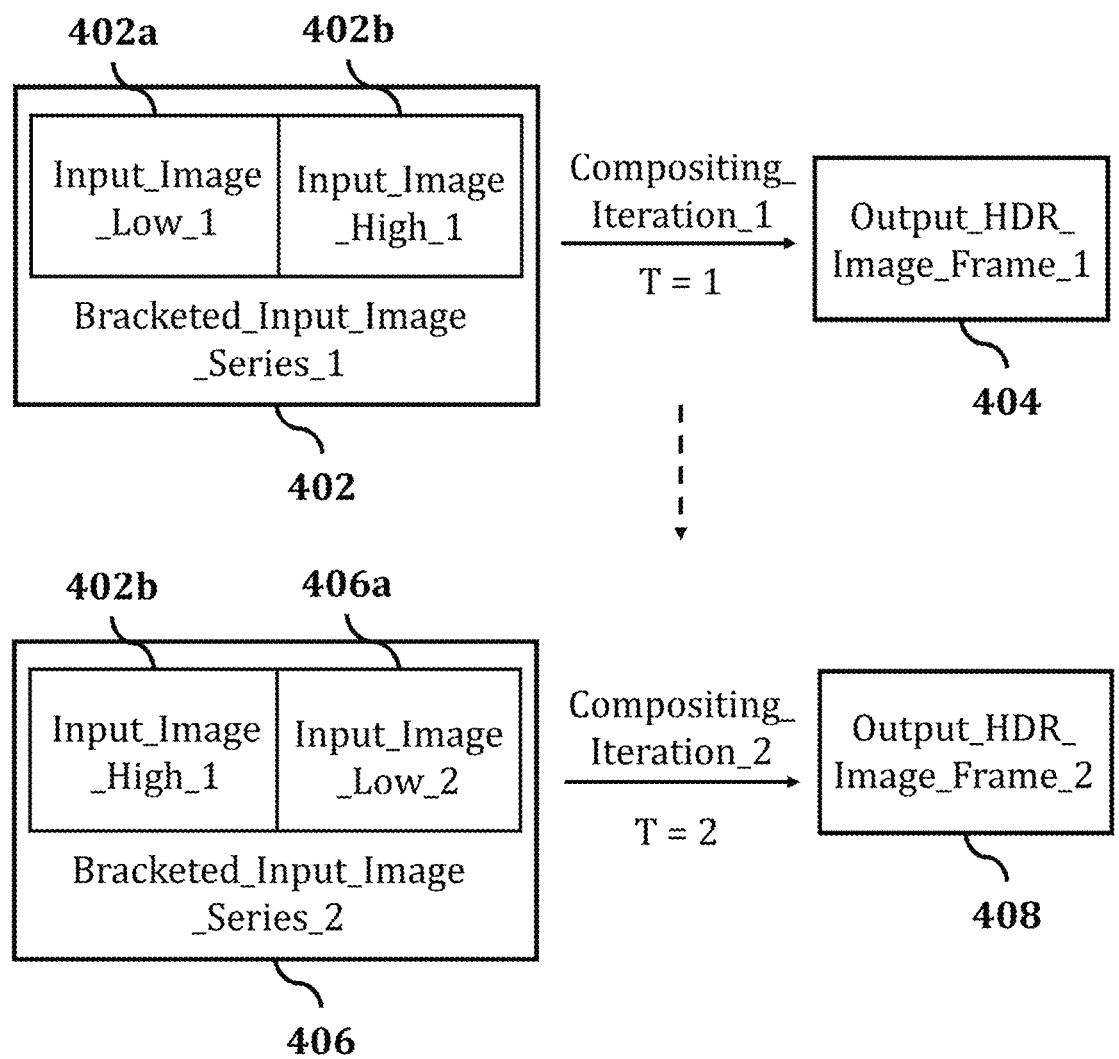
FIGS. 4B and 5B are respectively flow diagrams illustrating methods of generating successive output HDR image frames based on successive bracketed input image series' generated by an image sensor, in accordance with the teachings of the present invention.

FIGS. 4A and 4B illustrates an exemplary embodiment of the present invention, which may be contrasted with the prior art process discussed above in connection with FIGS. 3A and 3B.

FIG. 4A is a flowchart illustrating a method of generating successive output HDR image frames (for example, output HDR video frames) based on successive bracketed input image series' generated by an image sensor, in accordance with the teachings of the present invention.

Step 4002 comprises generating a first output HDR image frame (for example, a first output HDR video frame) by running a first iteration of a compositing process on a first bracketed input image series comprising at least a first input image acquired at a relatively low exposure level (in comparison with a second input image) and a second input image acquired at a relatively higher exposure level in comparison with the first input image.

Step 4004 comprises generating a second output HDR image frame (for example, a second output HDR video frame) by running a second iteration of the compositing process on a second bracketed input image series comprising at least the second input image that has also been used as an input image within the first bracketed input image series within step 4002 and that has been acquired at a relatively higher exposure level (in comparison with a third input image), and a third input image acquired at a relatively lower exposure level in comparison with the second input image.

The generated first output HDR image frame and second output HDR image frame may thereafter be displayed as successive image frames (for example, successive video frames within an output video stream).

The method of FIG. 4A is illustrated further in the flow diagram of FIG. 4B. As shown in FIG. 4B, a first output HDR image frame 404 (Output_HDR_Image_Frame_1) is generated (at step 4002) by running a first iteration of a compositing process on a first bracketed input image series 402 (Bracketed_Input_Image_Series_1) comprising a first input image 402a (Input_Image_Low_1) acquired at a relatively low exposure level (in comparison with second input image 402b) and a second input image 402b (Input_Image_High_1) acquired at a relatively higher exposure level in comparison with first input image 402a). It would be understood that the first iteration of the compositing process would involve one or more of image registration, image mixing and tone mapping involving first and second input images 402a and 402b, and further that image mixing involving the first and second input images 402a and 402b may involve generating a histogram corresponding to each of input images 402a and 402b, optionally generating a first joint comparametric histogram based on the histograms corresponding to each of input images 402a and 402b, and/or other data extraction/data processing/histogram generation steps involving each of input images 402a and 402b—which may then be used for generating a first composited output HDR image frame 404.

Subsequently, as shown in FIG. 4B, a second output HDR image frame 408 (Output_HDR_Image_Frame_2) is generated (at step 4004) by running a second iteration of the compositing process on a second bracketed input image series 406 (Bracketed_Input_Image_Series_2) comprising the second input image 402b (Input_Image_High_1) that is also an input image within the first bracketed input image series 402 (Bracketed_Input_Image_Series_1) and has been acquired at a relatively high exposure level (in comparison with a third input image 406*a*) and a third input image 406*a* (Input_Image_Low_2) acquired at a relatively lower exposure level in comparison with second input image 402*b*). It would be understood that the second iteration of the compositing process would once again involve one or more of image registration, image mixing and tone mapping involving second and third input images 402*b* and 406*a*, and further that image mixing involving the second and third input images 402*b* and 406*a* may rely on histograms that have been generated corresponding to each of input images 402*b* and 406*a*, optionally generating a second joint comparametric histogram based on the histograms corresponding to each of input images 402*b* and 406*a* and/or other data extraction/data processing/histogram generation steps involving each of input images 402*b* and 406*a*—which may then be used for generating a second composited output HDR image frame 408.

In contrast with the conventional method of FIGS. 3A and 3B, it would be noted that in the method of FIGS. 4A and 4B, since a histogram corresponding to the second input image 402*b* has already been generated as part of the first iteration of the compositing process (Compositing_Iteration_1) that was used to generate a first output HDR image frame 404 (Output_HDR_Image_Frame_1), this step of generating a histogram corresponding to the second input image 402*b* may be eliminated from the second iteration of the compositing process (Compositing_Iteration_2)—and the second iteration may rely on the previously generated histogram, or on one or more other data extraction or data processing steps that have already been implemented in connection with the second input image 402*b* as part of the first iteration of the compositing process, instead of having to execute the same data extraction/data processing/histogram generation step corresponding to the shared second input image in both the first and second iterations of the compositing process.

The elimination of said one or more data extraction/data processing/histogram generation steps in the second iteration has been found to result in significant optimizations in generation of successive output HDR image frames or output HDR video frames—as each generation of each successive output HDR image frame/video frame is now computationally less intensive that in the methods previously known in the art.

Figure 5A:
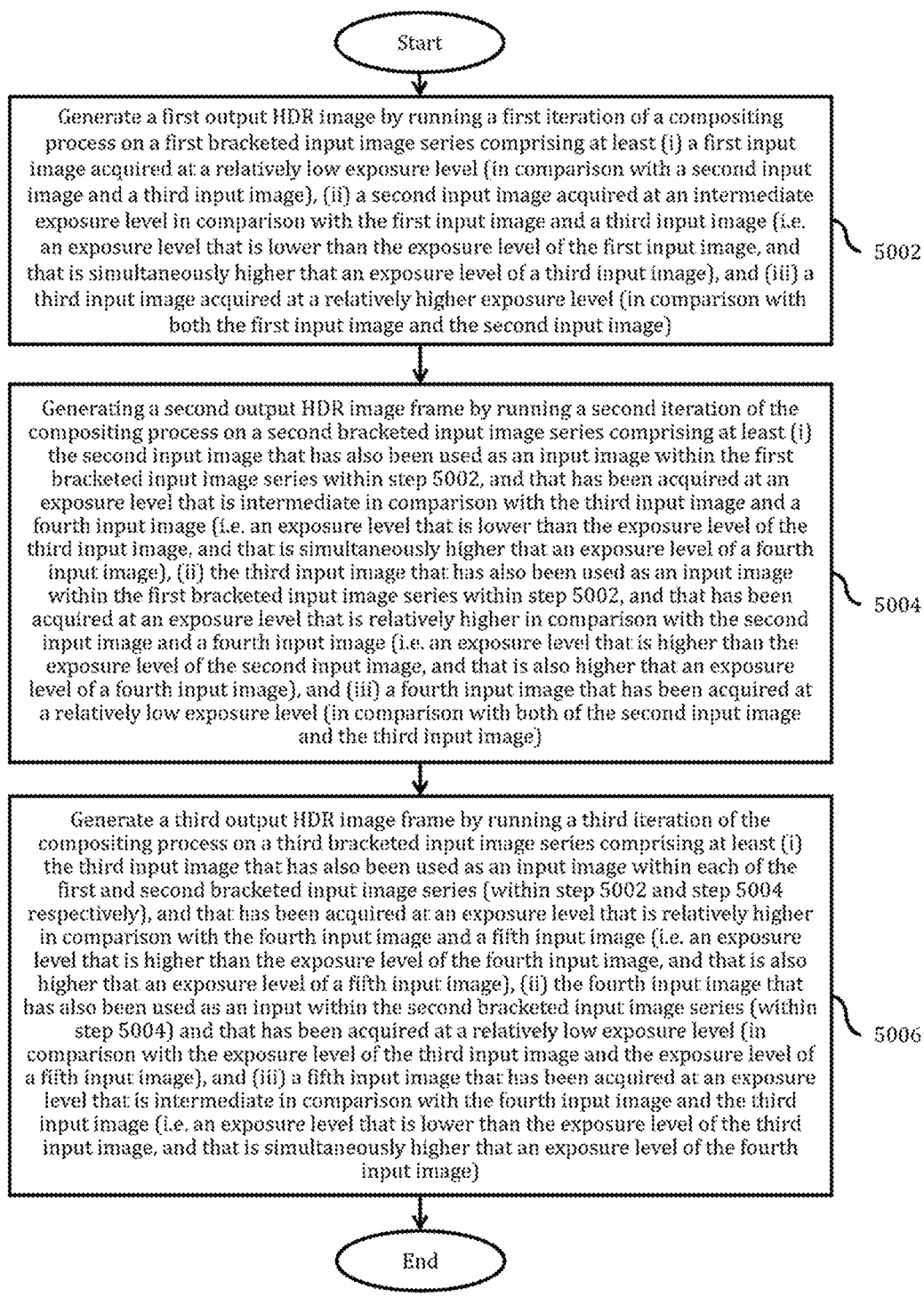
Figure 5B:
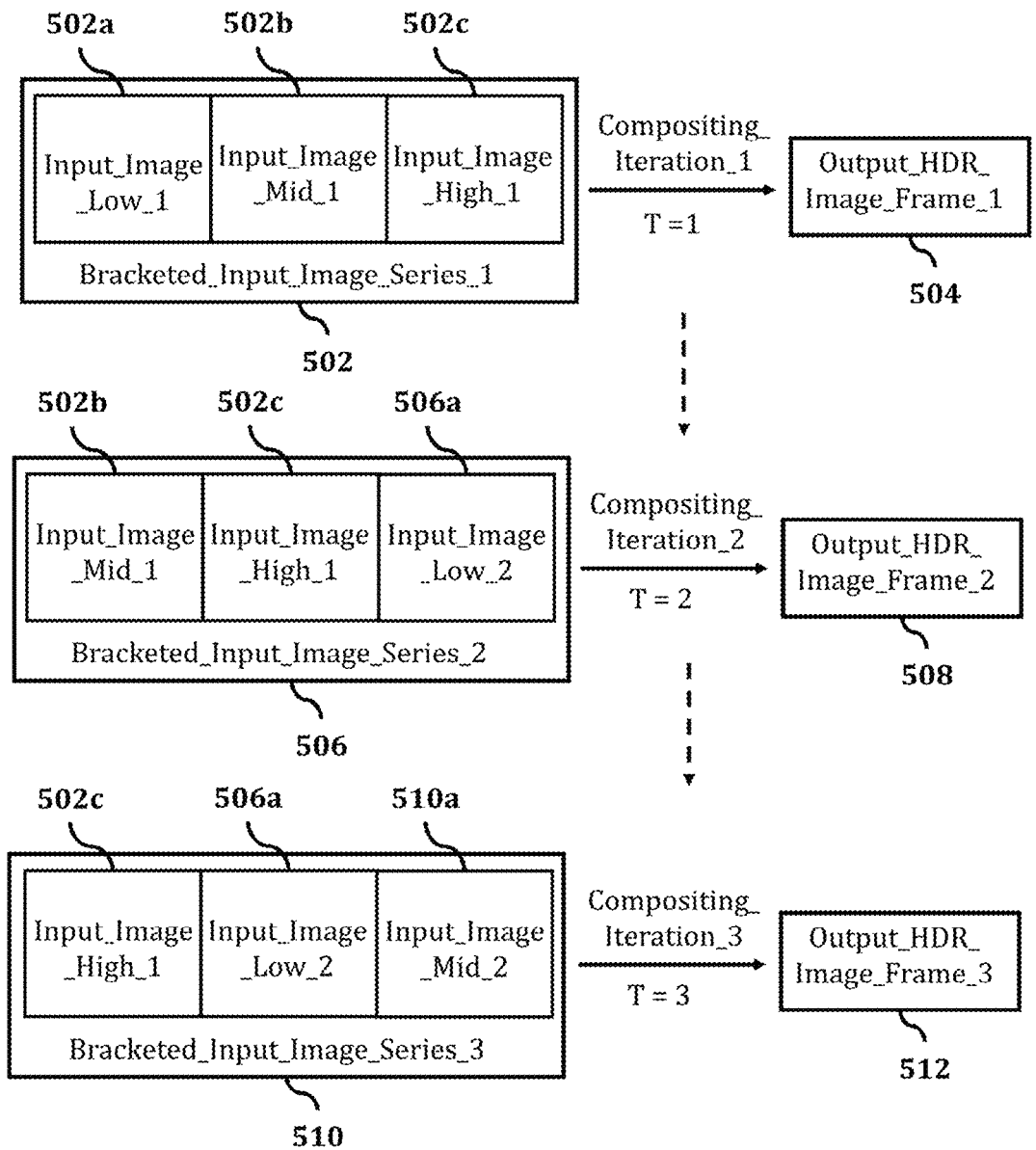

FIGS. 5A and 5B illustrates another exemplary embodiment of the present invention, where each output HDR image frame (for example, an output HDR video frame) is composited based on an bracketed input image series comprising three input images—respectively acquired under high, low and intermediate exposure conditions/parameters—and which embodiment further emphasizes the optimizations and advantages offered by the present invention.

FIG. 5A is a flowchart illustrating a method of generating successive output HDR image frames based on successive bracketed input image series' generated by an image sensor, in accordance with the teachings of the present invention.

Step 5002 comprises generating a first output HDR image frame (e.g. a first output HDR video frame) by running a first iteration of a compositing process on a first bracketed input image series comprising at least (i) a first input image acquired at a relatively low exposure level (in comparison with a second input image and a third input image), (ii) a second input image acquired at an intermediate exposure level in comparison with the first input image and a third input image (i.e. an exposure level that is lower than the exposure level of the first input image, and that is simultaneously higher that an exposure level of a third input image), and (iii) a third input image acquired at a relatively higher exposure level (in comparison with both the first input image and the second input image).

Step 5004 comprises generating a second output HDR image frame (e.g. a second output HDR video frame) by running a second iteration of the compositing process on a second bracketed input image series comprising at least (i) the second input image that has also been used as an input image within the first bracketed input image series within step 5002, and that has been acquired at an exposure level that is intermediate in comparison with the third input image and a fourth input image (i.e. an exposure level that is lower than the exposure level of the third input image, and that is simultaneously higher that an exposure level of a fourth input image), (ii) the third input image that has also been used as an input image within the first bracketed input image series within step 5002, and that has been acquired at an exposure level that is relatively higher in comparison with the second input image and a fourth input image (i.e. an exposure level that is higher than the exposure level of the second input image, and that is also higher that an exposure level of a fourth input image), and (iii) a fourth input image that has been acquired at a relatively low exposure level (in comparison with both of the second input image and the third input image).

Step 5006 comprises generating a third output HDR image frame (e.g. a third output HDR video frame) by running a third iteration of the compositing process on a third bracketed input image series comprising at least (i) the third input image that has also been used as an input image within each of the first and second bracketed input image series (within step 5002 and step 5004 respectively), and that has been acquired at an exposure level that is relatively higher in comparison with the fourth input image and a fifth input image (i.e. an exposure level that is higher than the exposure level of the fourth input image, and that is also higher that an exposure level of a fifth input image), (ii) the fourth input image that has also been used as an input within the second bracketed input image series (within step 5004) and that has been acquired at a relatively low exposure level (in comparison with the exposure level of the third input image and the exposure level of a fifth input image), and (iii) a fifth input image that has been acquired at an exposure level that is intermediate in comparison with the fourth input image and the third input image (i.e. an exposure level that is lower than the exposure level of the third input image, and that is simultaneously higher that an exposure level of the fourth input image).

The generated first output HDR image frame, second output HDR image frame and third output HDR image frame may thereafter be displayed as successive image frames (for example, as successive video frames within an output video stream).

The method of FIG. 5A is illustrated further in the flow diagram of FIG. 5B. As shown in FIG. 5B, a first output HDR image frame 504 (Output_HDR_Image_Frame_1) is generated by running a first iteration of a compositing process on a first bracketed input image series 502 (Bracketed_Input_Image_Series_1) comprising a first input image 502*a* (Input_Image_Low_1) acquired at a relatively low exposure level (in comparison with the second input image 502*b* and third input image 502*c*), a second input image 502*b* (Input_Image_Mid_1) acquired at an intermediate exposure level (in comparison with the first input image 502*a* and third input image 502*c*), and a third input image 502c (Input_Image_High_1) acquired at a relatively higher exposure level in comparison with first input image 502a and second input image 502b). It would be understood that the first iteration of the compositing process would involve one or more of image registration, image mixing and tone mapping involving first, second and third input images 502a, 502b and 502c, and further that image mixing involving the first, second and third input images 502a, 502b and 502c, may involve generating a histogram corresponding to each of input images 502a, 502b and 502c, other data extraction/data processing/histogram generation steps involving each of input images 502a, 502b and 502c, and optionally generating a first joint comparametric histogram based on the histograms corresponding to each of input images 502a and 502b, generating a second joint comparametric histogram based on the histograms corresponding to each of input images 502b and 502c, and generating a third joint comparametric histogram based on the histograms corresponding to each of input images 502c and 502a—which may then be used for generating a first composited output HDR image frame 504.

Subsequently, as shown in FIG. 5B, a second output HDR image frame 508 (Output_HDR_Image_Frame_2) is generated by running a second iteration of a compositing process on a second bracketed input image series 506 (Bracketed_Input_Image_Series_2) comprising second input image 502b (Input_Image_Mid_1) that is also an input image within the first bracketed input image series 502 and has been acquired at an intermediate exposure level in comparison with third input image 502c and a fourth input image 506a, third input image 502c (Input_Image_High_1) that is also an input image within the first bracketed input image series 502 and has been acquired at a relatively high exposure level in comparison with second input image 502b and fourth input image 506a, and a fourth input image 506a (Input_Image_Low_2)—which has been acquired at a relatively low exposure level (in comparison with the second input image 502b and the third input image 502c). It would be understood that the second iteration of the compositing process would involve one or more of image registration, image mixing and tone mapping involving second, third and fourth input images 502b, 502c and 506a, and further that image mixing involving the first, second and third input images 502b, 502c and 506a, may involve generating a histogram corresponding to each of input images 502b, 502c and 506a, other data extraction/data processing/histogram generation steps involving each of input images 502b, 502c and 506a, and optionally on the second joint comparametric histogram that has been generated based on the histograms corresponding to each of input images 502b and 502c, a fourth joint comparametric histogram based on the histograms corresponding to each of input images 502c and 506a, and a fifth joint comparametric histogram based on the histograms corresponding to each of input images 506a and 502b—which may then be used for generating a second composited output HDR image frame 508. It would however be noted that since histograms corresponding to the second input image 502b and the third input image 502c and/or the second comparametric histogram that has been generated based on the histograms corresponding to each of input images 502b and 502c have already been generated as part of the first iteration of the compositing process (Compositing_Iteration_1) that was used to generate a first output HDR image frame 504 (Output_HDR_Image_Frame_1), said steps may be eliminated from the second iteration of the compositing process (Compositing_Iteration_2)—and the second iteration may rely on the previously generated histograms, comparametric histogram, and/or one or more other data extraction or data processing steps that have already been implemented in in the first iteration of the compositing process, instead of having to execute the same data extraction/data processing/histogram generation steps a second time.

Yet further, and as shown in FIG. 5B, a third output HDR image frame 512 (Output_HDR_Image_Frame_3) is generated by running a third iteration of a compositing process on a third bracketed input image series 510 (Bracketed_Input_Image_Series_3) comprising third input image 502c (Input_Image_High_1) that is also an input image within the first and second bracketed input image series 502, 506 and has been acquired at a higher exposure level in comparison with fourth input image 506a and a fifth input image 510a, fourth input image 506a (Input_Image_Low_2) that is also an input image within the second bracketed input image series 506 and has been acquired at a relatively low exposure level in comparison with third input image 502c and fifth input image 510a, and a fifth input image 510a (Input_Image_Mid_2)—which has been acquired at an intermediate exposure level (in comparison with the third input image 502c and the fourth input image 506a). It would be understood that the third iteration of the compositing process would involve one or more of image registration, image mixing and tone mapping involving third, fourth and fifth input images 502c, 506a and 510a, and further that image mixing involving the third, fourth and fifth input images 502c, 506a and 510a, may involve generating a histogram corresponding to each of input images 502c, 506a and 510a, other data extraction/data processing/histogram generation steps involving each of input images 502c, 506a and 510a, and optionally on the fourth joint comparametric histogram that has been generated based on the histograms corresponding to each of input images 502c and 506a, a sixth joint comparametric histogram based on the histograms corresponding to input images 506a and 510a and a seventh joint comparametric histogram corresponding to input images 510a and 502c—which may then be used for generating a third composited output HDR image frame 512. Once again since histograms corresponding to the third input image 502c and the fourth input image 506a and/or the fourth comparametric histogram that has been generated based on the histograms corresponding to each of input images 502c and 506a have already been generated as part of either the first iteration of the compositing process (Compositing_Iteration_1) that was used to generate a first output HDR image frame 504 (Output_HDR_Image_Frame_1) or the second iteration of the compositing process (Compositing_Iteration_2) that was used to generate a second output HDR image frame 508 (Output_HDR_Image_Frame_2), said steps may be eliminated from the third iteration of the compositing process (Compositing_Iteration_3)—and the third iteration may rely on the previously generated histograms, comparametric histogram, and/or one or more other data extraction or data processing steps that have already been implemented in in the first or second interations of the compositing process, instead of having to execute the same data extraction/data processing/histogram generation steps yet again.

Again, FIG. 5B establishes the manner in which one or more data extraction or data processing steps may be eliminated using the methods of the present invention and as discussed above, the elimination of said one or more data extraction/data processing/histogram generation steps in across compositing iterations would result in significant optimizations in generation of successive output HDR image frames—as each generation of each successive output HDR image frame is now computationally less intensive that in the methods previously known in the art. Additionally, as a comparison of FIGS. 4A and 4B with FIGS. 5A and 5B would establish, the optimizations effected by the invention increase as the number of input images within each bracketed input image series increases, as the number of data extraction steps and histogram generation steps that are common across iterations increases directly with the increase in number of input images.

It has been discovered that in addition to the significant reduction in processing steps and in computational load as a result of the present invention, the sharing of one or more input images across successive (or immediately adjacent) compositing iterations reduces the latency/lag involved in generation of output HDR video frames for a videostream, since the rate of HDR frame output can now be equal to or substantially equal to the rate of acquisition of input images by an image sensor—since a new output HDR video frame can be generated based on each additional LDR input image acquired by an image sensor. This is a significant improvement over prior art solutions, where since an output HDR video frame was generated once for every two or three input frames, the output videostream was jerky, choppy or found to involve perceptible delay or lag.

While the examples presented in the above description address combining of multiple image frames within an input videostream to generate output HDR video frames for an HDR videostream, the present invention can be applied in any problem where a particular stream of data with varying parameters needs to be processed in real-time, where the computational intensity of the processing is very high. Some non-limiting exemplary applications are briefly described below.

Example 1—Real-time audio HDR: Obtaining real-time high dynamic range audio is an extremely difficult task because of the computational complexity and time delay caused due to it. The present invention can be applied in the HDR audio case where a particular set of low dynamic range samples of audio captured with different capture parameters (such as frequency band, analog gain and loudness range) needs to be composited into a single sample of audio with high dynamic range. This process when repeated continuously at high sample rates would lead to real-time HDR audio. Real-time HDR audio can be captured with the present invention. The dynamic range in the case of audio could be the loudness of the audio sample or the frequency band of the audio sample. Multiple LDR audio samples with varying gain settings (thus capturing varying loudness ranges) can be composited into a single HDR audio sample that has all the loudness ranges captured in the same sample. This can be useful in theater audio recordings where traditionally multiple audio channels are required to capture multiple loudness ranges due to lack of real-time composition of HDR audio, the present invention enables real-time HDR audio thus eliminating the need for multiple audio recording channels for the multiple loudness ranges. Similarly, the present invention can be used to for real-time composition of multiple samples with different audio frequency bands into HDR audio where the composited sample captures qualitative data in multiple frequency bands. Such a system can be used in creating superhuman hearing aids that allow humans to hear sounds in audible as well as ultrasonic ranges in real-time.

Example 2—Multi sensor data fusion: There is a need for devices that are capable of fusing data from multiple sensors capturing the same scene in real-time. For example, real-time fusion of data from visible, near infrared, short wave infrared and long wave infrared imaging sensors. The fusion process is very computationally intensive thus leading to results that are far from real-time in nature. One major reason for this is the varying frame rates of the individual sensors. Traditional processing pipelines run at the frame rate of the bottleneck, ie. the slowest frame rate, since the processing is only done when one sample of each sensor is obtained. However, in reality while the bottleneck sensor (slowest frame rate) captures a single frame the other sensors can capture multiple frames. Thus with traditional methods we get a very choppy result where the changes in the scene are captured at a very slow frame rate often making the video look like it is stopping after every frame captured, even though most of the sensors are capable of capturing at significantly higher frame rates. The present invention radically improves the frame rate since it employs a rolling envelope of individual frames from the sensors, thus allowing the observed frame rate to be same as the frame rate of the fastest sensor (sensor with highest frame rate) as opposed to the slowest sensor as in the traditional case. This allows the user to have a much smoother experience while also making the output data much more dynamic since it refreshes at the rate of the fastest sensor, thus allowing it to capture and composite all the minute changes (in terms of time) occurring in the scene.

Figure 6:
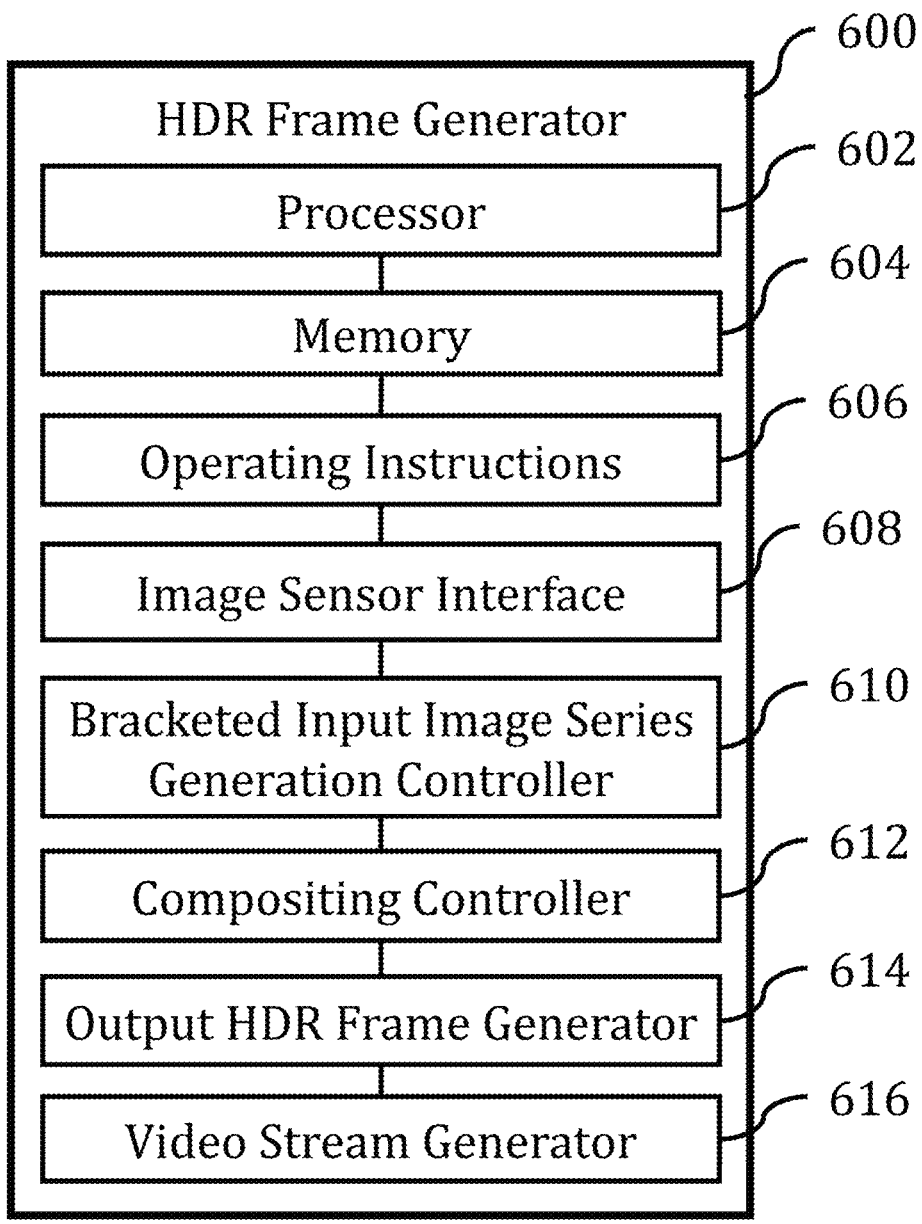
FIG. 6 illustrates an HDR frame generator configured to implement one or more embodiments of the present invention.

FIG. 6 illustrates an HDR frame generator configured to implement one or more embodiments of the present invention.

In an embodiment, HDR frame generator 600 is configured to implement any of the methods described in connection with FIGS. 4A, 4B, 5A or 5B above, or any one or more method steps therein.

HDR frame generator 600 may comprise a (i) a processor (or a processor implemented controller) 602, (ii) a memory 604, (ii) operating instructions 606 configured to enable HDR frame generator 600 to implement any one or more method(s) of the present invention for generating a plurality of HDR image frames, (iv) image sensor interface 608 configured to enable HDR frame generator 600 to interface with one or more image sensor(s) and to receive image information (for example pixel value information or image frame information or LDR image frames) from each such image sensor(s), (v) bracketed input image series generation controller 610 configured to enable generation of one or more bracketed input image series, each series comprising a plurality of images or image frames, for the purposes of generating one or more HDR image frames in accordance with the teachings of the methods described above in connection with any of FIGS. 4A, 4B, 5A or 5B, (vi) compositing controller 612 configured for running one or more iterations of a compositing process on one or more bracketed input image series, wherein each bracketed input image series comprises a plurality of input images—and wherein the compositing process may in certain embodiments involve any one or more of image registration, image mixing, tone mapping, histogram generation and/or comparametric histogram generation, involving the plurality of input images, (vii) output HDR frame generator 614 configured to generate a composited output HDR image frame (or video image frame) based on output from the compositing process implemented by compositing controller 612, and (viii) optionally a video stream generator 616 configured to generate (and/or control display of) an output video stream that comprises a plurality of output HDR image frames generated by output HDR frame generator 614.

Figure 7:
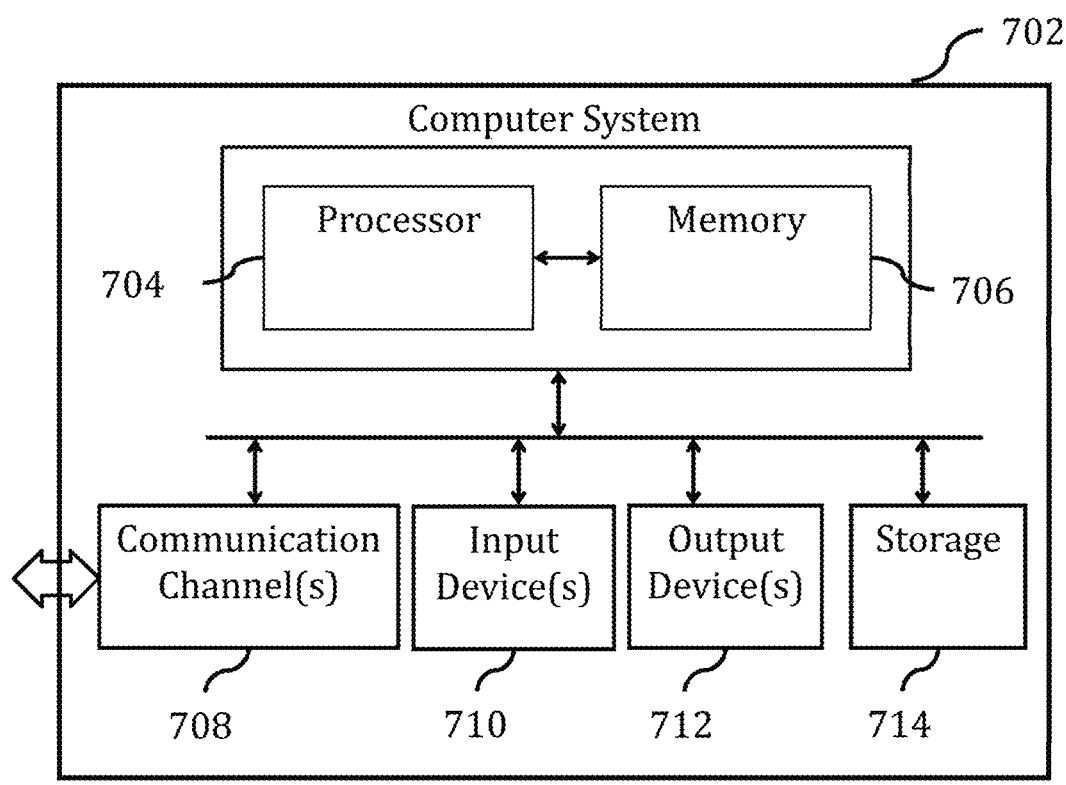
FIG. 7 illustrates an exemplary computer system according to which various embodiments of the present invention may be implemented.

FIG. 7 illustrates an exemplary computer system according to which various embodiments of the present invention may be implemented.

System 700 includes computer system 702 which in turn comprises one or more processors 704 and at least one memory 706. Processor 704 is configured to execute program instructions—and may be a real processor or a virtual processor. It will be understood that computer system 702 does not suggest any limitation as to scope of use or functionality of described embodiments. The computer system 702 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 702 in accordance with the present invention may include one or more servers, desktops, laptops, tablets, smart phones, mobile phones, mobile communication devices, tablets, phablets and personal digital assistants. In an embodiment of the present invention, the memory 706 may store software for implementing various embodiments of the present invention. The computer system 702 may have additional components. For example, the computer system 702 may include one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702 using a processor 704, and manages different functionalities of the components of the computer system 702.

The communication channel(s) 708 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 710 may include, but is not limited to, a touch screen, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 702.

The storage 714 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 702. In various embodiments of the present invention, the storage 714 may contain program instructions for implementing any of the described embodiments.

In an embodiment of the present invention, the computer system 702 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 702. The method described herein is typically implemented as a computer program product, comprising a set of program instructions that is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages—in particular, by significantly reducing the requirement for access token validation communications between resource servers within a server system and a identity authentication server that is external to said server system, thereby (i) reducing load on the external identity authentication server, reducing external network traffic, reducing service time latency, and reducing resource server response delays that arise as a consequence of network slowdowns. The present invention can be applied in any problem where a particular stream of data with varying parameters needs to be processed in real-time, where the computational intensity of the processing is very high.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

I claim:

1. A method for generating a plurality of high dynamic range image frames, the method comprising the steps of:
   receiving a first set of input image frames comprising at least a first input image frame and a second input image frame, wherein:
   the first input image frame has been generated at a first exposure level; and the second input image has been generated at a second exposure level that is different than the first exposure level;

generating a first high dynamic range image frame based on the first set of input image frames;

receiving a second set of input image frames comprising at least the second input image frame and a third input image frame, wherein:
the third input image frame has been generated at a third exposure level; and
the third exposure level is different from the second exposure level;

generating a second high dynamic range image frame based on the second set of input image frames; and initiating successive display of the first high dynamic range image frame and the second high dynamic range image frame on a display device, wherein generating either of the first high dynamic range image frame based on the first set of input image frames, or the second high dynamic range image frame based on the second set of input image frames, includes implementing any of the steps of image registration of a plurality of input image frames, image mixing based on a plurality of input image frames, tone mapping based on a plurality of input image frames, generating a histogram based on input image information corresponding to a plurality of input image frames, and generating a joint comparametric histogram based on histograms.

2. The method as claimed in claim 1, wherein:
the second exposure level is higher than the first exposure level; or
the third exposure level is lower than the second exposure level.

3. The method as claimed in claim 2, wherein:
the first set of input images includes a fourth input image frame having a fourth exposure level, wherein the fourth exposure level is higher than the first exposure level, and is lower than the second exposure level;
the second set of input images includes the fourth input image frame; and
the third exposure level is different from the fourth exposure level.

4. The method as claimed in claim 3, wherein the third exposure level is lower than the fourth exposure level.

5. The method as claimed in claim 1, comprising:
receiving a third set of input image frames comprising at least the third input image frame and a fifth input image frame, wherein:
the fifth input image frame has been generated as a fifth exposure level; and
the fifth exposure level is different from the third exposure level;
generating a third high dynamic range image frame based on the third set of input image frames; and
initiating display of the third high dynamic range image frame on the display device, successively after the initiation of display of the second high dynamic range image frame on the display device.

6. The method as claimed in claim 5, wherein the fifth exposure level is higher than the third exposure level.

7. A system for generating a plurality of high dynamic range image frames, the system comprising a processor configured for implementing the steps of:
receiving a first set of input image frames comprising at least a first input image frame and a second input image frame, wherein:
the first input image frame has been generated at a first exposure level; and
the second input image has been generated at a second exposure level that is different from the first exposure level;

generating a first high dynamic range image frame based on the first set of input image frames;

receiving a second set of input image frames comprising at least the second input image frame and a third input image frame, wherein:
the third input image frame has been generated at a third exposure level; and
the third exposure level is different from the second exposure level;

generating a second high dynamic range image frame based on the second set of input image frames; and initiating successive display of the first high dynamic range image frame and the second high dynamic range image frame on a display device, wherein the processor is configured such that generating either of the first high dynamic range image frame based on the first set of input image frames, or the second high dynamic range image frame based on the second set of input image frames, includes implementing any of the steps of image registration of a plurality of input image frames, image mixing based on a plurality of input image frames, tone mapping based on a plurality of input image frames, generating a histogram based on input image information corresponding to a plurality of input image frames, and generating a joint comparametric histogram based on histograms.

8. The system as claimed in claim 7, wherein:
the second exposure level is higher than the first exposure level; or
the third exposure level is lower than the second exposure level.

9. The system as claimed in claim 7, wherein the processor is configured such that:
the first set of input images includes a fourth input image frame having a fourth exposure level, wherein the fourth exposure level is higher than the first exposure level, and is lower than the second exposure level;
the second set of input images includes the fourth input image frame; and
the third exposure level is different from the fourth exposure level.

10. The system as claimed in claim 9, wherein the third exposure level is lower than the fourth exposure level.

11. The system as claimed in claim 7, wherein the processor is configured for:
receiving a third set of input image frames comprising at least the third input image frame and a fifth input image frame, wherein:
the fifth input image frame has been generated as a fifth exposure level; and
the fifth exposure level is different from the third exposure level;
generating a third high dynamic range image frame based on the third set of input image frames; and
initiating display of the third high dynamic range image frame on the display device, successively after the initiation of display of the second high dynamic range image frame on the display device.

12. The system as claimed in claim 11, wherein the fifth exposure level is higher than the third exposure level.

13. A computer program product comprising a non-transitory computer readable storage medium having stored thereon, computer code for implementing a method of generating a plurality of high dynamic range image frames, the computer readable program code comprising instructions for implementing within a processor based computing system, the steps of:
- receiving a first set of input image frames comprising at least a first input image frame and a second input image frame, wherein:
  - the first input image frame has been generated at a first exposure level; and
  - the second input image has been generated at a second exposure level that is different from the first exposure level;
- generating a first high dynamic range image frame based on the first set of input image frames;
- receiving a second set of input image frames comprising at least the second input image frame and a third input image frame, wherein:
  - the third input image frame has been generated at a third exposure level; and
  - the third exposure level is different from the second exposure level;
- generating a second high dynamic range image frame based on the second set of input image frames; and
- initiating successive display of the first high dynamic range image frame and the second high dynamic range image frame on a display device,
- wherein generating either of the first high dynamic range image frame based on the first set of input image frames, or the second high dynamic range image frame based on the second set of input image frames, includes implementing any of the steps of image registration of a plurality of input image frames, image mixing based on a plurality of input image frames, tone mapping based on a plurality of input image frames, generating a histogram based on input image information corresponding to a plurality of input image frames, and generating a joint comparametric histogram based on histograms.

* * * * *